United States Patent [19]

Ono et al.

[11] Patent Number: 4,997,293

[45] Date of Patent: Mar. 5, 1991

[54] ANTI-ELECTROLYTIC CORROSION TYPE ROLLING BEARING

[75] Inventors: Hidehiko Ono, Nagoya; Ken Horiuchi, Mie, both of Japan

[73] Assignees: Nippon Sharyo Seizo Kabushiki Kaisha, Nagoya; NTN Corporation, Osaka, both of Japan

[21] Appl. No.: 497,300

[22] Filed: Mar. 22, 1990

[51] Int. Cl.⁵ .............................................. F16C 19/00
[52] U.S. Cl. .................................... 384/476; 384/492; 384/569
[58] Field of Search ............... 384/476, 492, 277, 569, 384/907.1, 913, 912

[56] References Cited

U.S. PATENT DOCUMENTS 3,924,906  12/1975  Kitaoka ............................... 384/476
4,606,657  8/1986   Tanaka ................................ 384/492
4,634,300  1/1987   Takebayashi et al. ............... 384/492

OTHER PUBLICATIONS

Japanese Utility Model Kokai (Laid-Open) Publication No. 60-8526 Jun. 13, 1985.

Primary Examiner—Lenard A. Footland
Attorney, Agent, or Firm—Armstrong, Nikaido, Marmelstein, Kubovcik & Murray

[57] ABSTRACT

An anti-electrolytic corrosion type rolling bearing of the present invention has an insulation coating layer formed on the outer surface of, or the outer surface and side walls of, the outer ring. The insulation coating layer has an insulating layer sandwiched between metal layers.

12 Claims, 4 Drawing Sheets

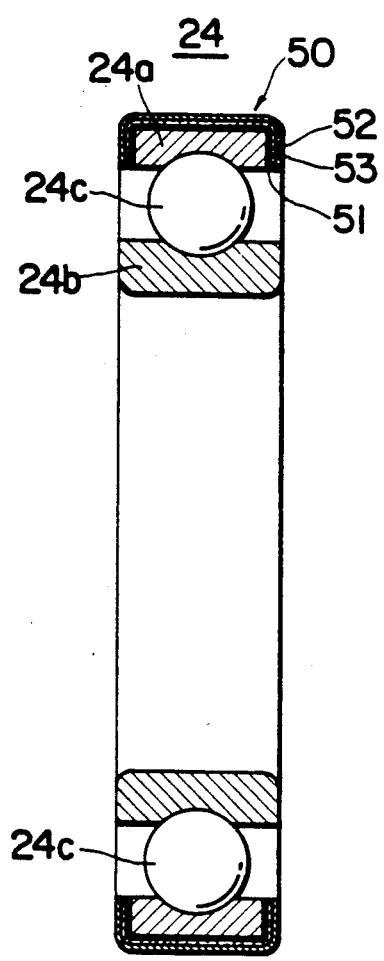
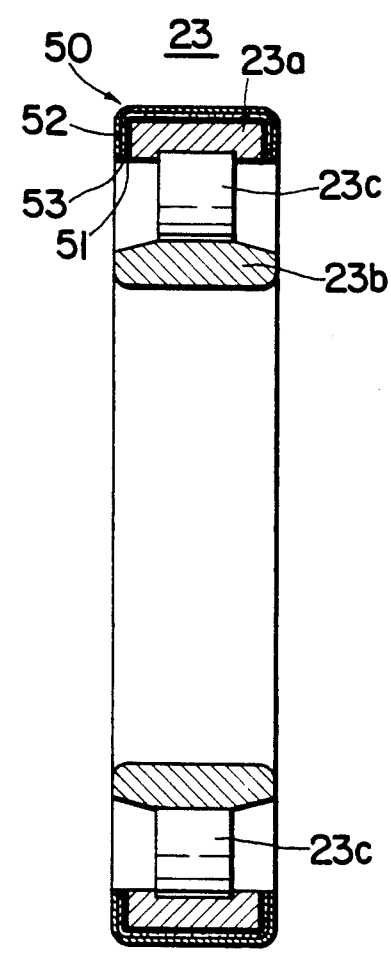
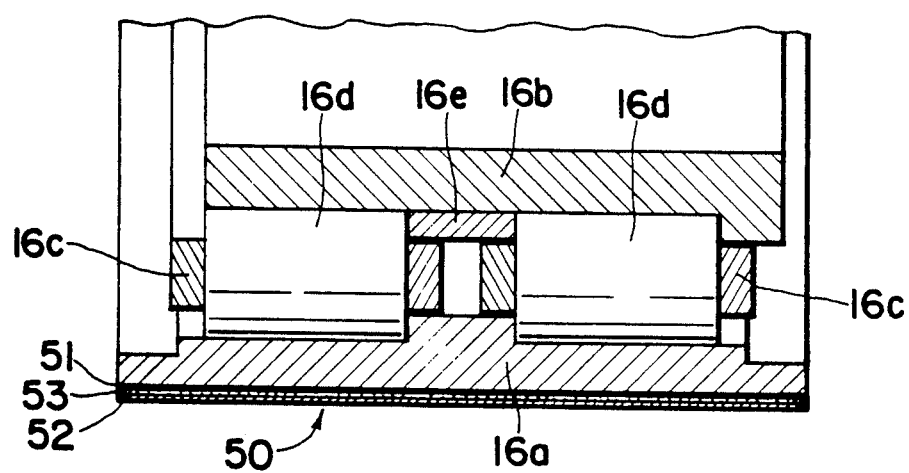

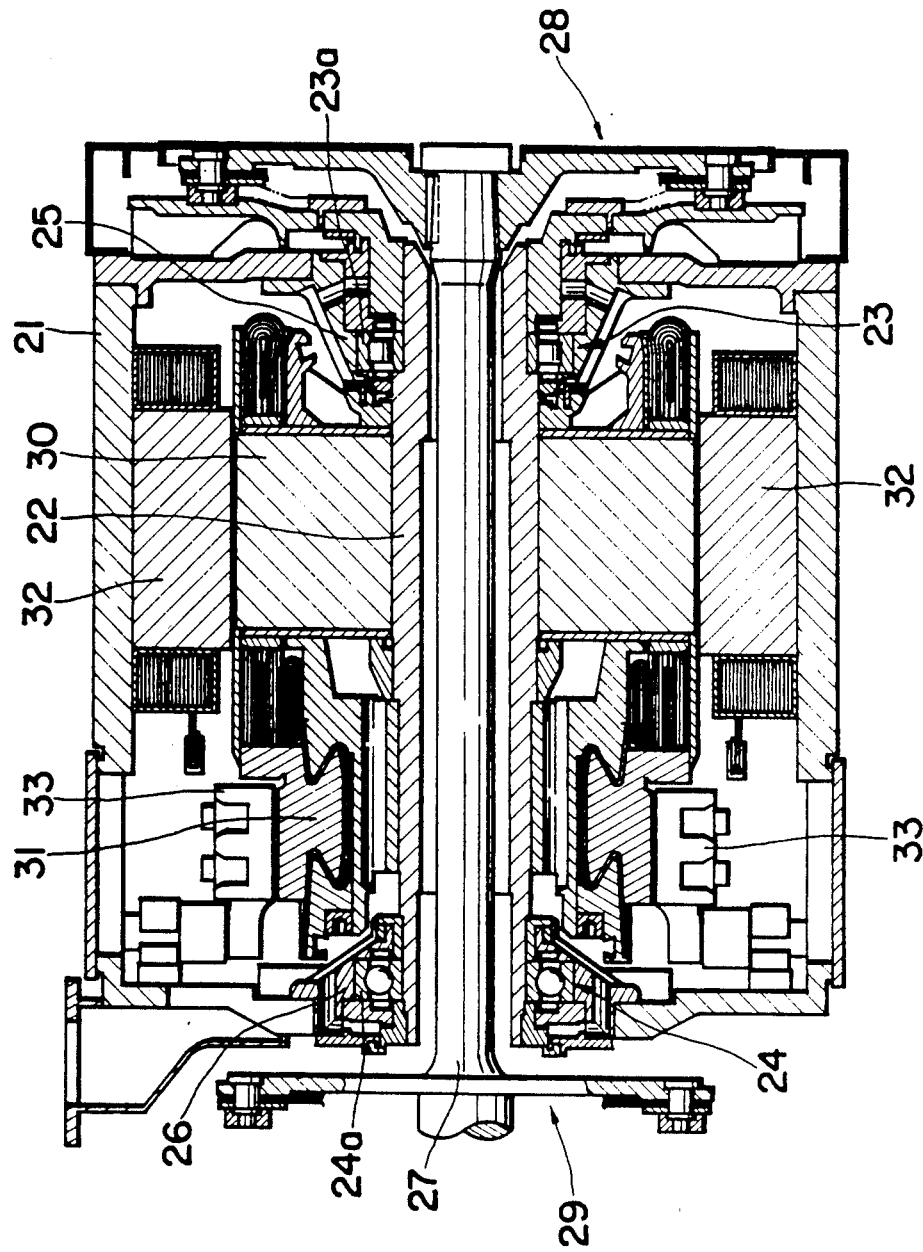

ANTI-ELECTROLYTIC CORROSION TYPE ROLLING BEARING

BACKGROUND OF THE INVENTION

1. Field of the Invention

The present invention relates to an anti-electrolytic corrosion type rolling bearing for use in, for example, a motor or a truck of a railway rolling stock.

2. Description of the Related Art

With a rolling bearing for use in the motor or axle of a railway rolling stock, when a current collector for current grounding, which permits a current from the motor to flow from a wheel to a rail to be grounded, functions insufficiently or improperly, the motor current flows through the rolling bearing to a wheel, then to the associated rail to be grounded therethrough. This is likely to cause a rolling element of the bearing to spark between the rolling face of the outer ring and that of the inner ring. In other words, a so-called electrolytic corrosion occurs. This phenomenon certainly wear out the bearing faster.

As a solution to this shortcoming, there is a technique proposed and disclosed in, for example, Published Unexamined Japanese Utility Model No. 60-85626, in which an insulating layer is formed on the outer surface and both side walls of the outer ring of a rolling bearing for a traction motor of a railway rolling stock and those of the inner ring by sputtering of melt ceramics and an insulating synthesized resin is contained in the insulating layer.

The ceramic material for the insulating layer, which may be alumina, gray alumina, zirconia or the like, is not easily adapted to the material for the bearing and thus is not easily adhered thereto.

Because the outer ring of the bearing in use is fitted in a bearing box, the insulating layer formed on the outer ring requires that, after sputtering, its outer surface be ground to a predetermined thickness and accuracy suitable for the inner wall of the bearing box. Due to the hardness and brittleness of the material for the insulating layer, the process of grinding the insulating layer to the final thickness requires a considerable number of steps and time. Further, in fitting the bearing with an insulating layer formed thereon into the bearing box, some force or pressure needs to be applied and this pressure is apt to separate the insulating layer from the bearing.

SUMMARY OF THE INVENTION

Accordingly, it is an object of this invention to provide an anti-electrolytic corrosion type rolling bearing which facilitates sputtering of a melt insulating layer with a high adhesiveness to prevent its easy separation from the bearing, and facilitates grinding of the outer surface of the bearing which is adapted to be fitted in a bearing box with some force.

To achieve the object, according to the present invention, an insulating layer is formed between metal layers on the outer surface of the outer ring of the anti-electrolytic corrosion type rolling bearing or over a region extending from the outer surface to both side walls of the outer ring.

With the provision of the insulating layer in the above manner, one of the metal layers serving as an inner coat permits easier adhesion of the insulating layer on outer surface of the outer ring, so that sputtering of the insulating layer can be easily conducted in a short period of time.

Further, the other metal layer serving as an outer coat prevents the insulating layer from being separated from the outer ring when the bearing is pressed in a bearing box and also permits the outer surface of the coating layer to be ground easily at high accuracy.

BRIEF DESCRIPTION OF THE DRAWINGS

FIGS. 1 through 3 illustrate one embodiment of the present invention in which FIG. 1 is a front view of part of an example of a truck for a railway rolling stock, FIG. 2 is a cross section taken along the line 2—2 in FIG. 1, and FIG. 3 is a cross section illustrating the essential portion of an anti-electrolytic corrosion double row roller bearing serving as a bearing of the axle; and FIGS. 4 through 6 illustrate another embodiment of the present invention in which FIG. 4 is a front cross section exemplifying a motor of a railway rolling stock, FIG. 5 is a cross section exemplifying an anti-electrolytic corrosion roller bearing serving as a bearing of the motor, and FIG. 6 is a cross section illustrating an example of an anti-electrolytic corrosion ball bearing for use as a bearing of the motor.

DESCRIPTION OF THE PREFERRED EMBODIMENTS

Figure 1:
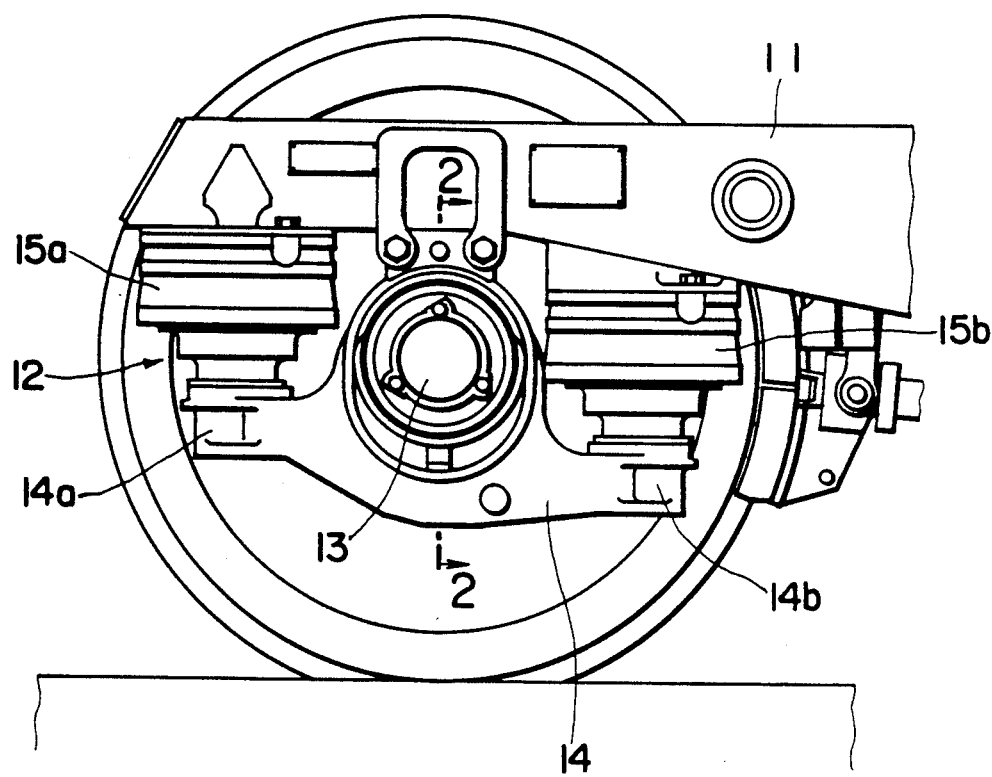
Figure 2:
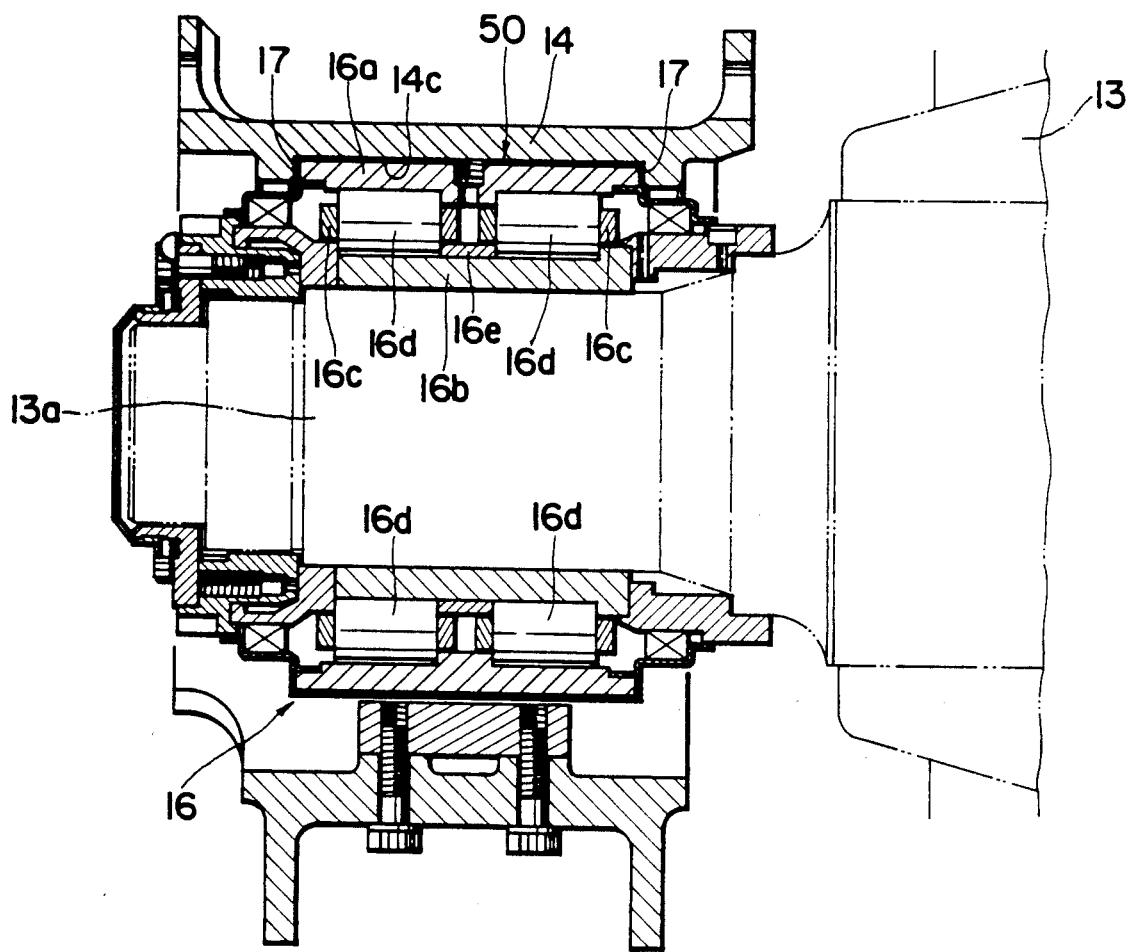

One preferred embodiment of this invention as applied to a bearing of a truck for a railway rolling stock will be described below referring to FIGS. 1 through 3.

The truck for a railway rolling stock has an axle-box suspension 12 provided at a side beam 11 of its truck frame. The axle-box suspension 12 comprises an axle box 14 for supporting an axle 13 and axle springs 15a and 15b, respectively provided between front and rear projecting portions 14a and 14b of the axle box 14 and the side beam 11. The axle 13 has its journal 13a supported rotatable on a bearing box 14c of the axle box 14 via a rolling bearing 16. The rolling bearing 16 is a double row roller bearing and has a number of rollers 16d accommodated rotatable in two rows between an outer ring 16a and an inner ring 16b. The two rows of the rollers 16 are respectively supported by a pair of cages 16c. The rolling bearing 16 has its outer ring 16a, together with insulating rings 17 provided on its both side walls, pressed in the bearing box 14c. Reference numeral 16e denotes a spacer.

An insulation coating layer 50 is formed on the outer surface of the outer ring 16a of the rolling bearing 16. This layer 50 has an insulating layer 53 sandwiched between metal layers 51 and 52. More specifically, the layer 50 comprises the metal layer 51 serving as an inner coat provided on the outer surface of the outer ring 16a, the insulating layer 53 provided on the outer surface of the metal layer 51, and the metal layer 52 serving as an outer coat provided on the outer surface of the layer 53.

Referring to FIGS. 4 to 6, another embodiment of this invention as applied to a bearing of a traction motor of a railway rolling stock will be described below.

The traction motor of a railway rolling stock is of a hollow shaft parallel cardan type. In a housing 21, a hollow armature shaft 22 is disposed with its both end portions rotatable via a roller bearing 23 and a ball bearing 24. The roller bearing 23 and ball bearing 24 respectively have their outer rings 23a and 24a pressed in bearing boxes 25 and 26.

A cardan shaft 27 is provided in the armature shaft 22 concentrical thereto. The armature shaft 22 has its one end connected via a flexible plate coupling 28 to one end of the cardan shaft 27 in an interlockingly rotatable manner. The cardan shaft 27 has the other end provided with a flexible plate coupling 29 serving as an output section.

An armature 30 and a commutator 31 are secured to the outer surface of the armature shaft 22. On the inner wall of the housing 21, a plurality of fixed magnetic poles 32 are disposed, facing the armature 30, and a plurality of brushes 33 are disposed, facing the commutator 31.

As shown in FIG. 5, the roller bearing 23 has a plurality of rollers 23c provided in a row between its outer ring 23a and inner ring 23b. The ball bearing 24 has a plurality of balls 24c provided in a row between its outer ring 24a and inner ring 24b, as shown in FIG. 6.

An insulation coating layer 50 is formed on the outer surface and both side walls of each of the outer rings 23a and 24a of the roller bearing 23 and ball bearing 24. Provision of the insulation coating layer 50 over the outer surface and both side walls of each of the outer rings 23a and 24a can eliminate the insulating ring 17 employed in the first embodiment.

The insulation coating layer 50 has an insulating layer 53 sandwiched between metal layers 51 and 52, as per the previous embodiment. More specifically, the layer 50 comprises the metal layer 51 serving as an inner coat provided on the outer surface of each of the outer rings 23a and 24a, the insulating layer 53 provided on the outer surface of the metal layer 51, and the metal layer 52 serving as an outer coat provided on the outer surface of the layer 53.

A detailed description of this insulation coating layer 50 will be given below.

The metal layer or inner coat 51 serves as a base layer for providing the insulating layer 53 on the outer ring. The material for the metal layer 51 should have an excellent adhesiveness for both the outer ring and the insulating layer 53. It is preferable that the metal layer 51 is formed by a sputtering method which can provide a high adhesiveness to the outer ring. In this respect, the metal layer 51 is generally made of a metal-based sputtering material. Preferably, the material may be a stainless steel based material, such as SUS410L, SUS430L, SUS304L or SUS316L, various iron-chrome based materials, such as a high carbon type, intermediate carbon type and low carbon type, or a nickel-aluminum based material containing a mixture of nickel and aluminum. A sufficient thickness of the metal layer 51 is 0.1 to 0.15 mm.

The metal layer or outer coat 52 can be formed of the same material and the same sputtering method as the metal layer 51. The proper thickness of this metal layer 52 is 0.3 to 0.4 mm in consideration of the grinding allowance of 0.15 to 0.2 mm for dimensional inspection needed at the time of mounting the bearing in the bearing box.

The insulating layer 53 sandwiched between the metal layers 51 and 52 may be formed by sputtering a ceramic material, such as alumina, gray alumina (mixture of alumina and titania), or zirconia. A sufficient thickness of this insulating layer 53 is approximately 0.3 to 0.4 mm.

The above structure of the insulation coating layer 50 permits the insulating layer 53 to be surely coated via the metal layer 51 on the outer surface of each outer ring or on the outer surface and the side walls of the outer ring. The final dimension of the outer ring required at the time of pressing it in the bearing box can be carried out by grinding the metal layer 52. As the metal layer 52 is softer and has a greater deformation than the insulating layer 53, the grinding step is easier, the dimensional accuracy can be improved accordingly and the time for providing the allowable dimension can be significantly shortened.

Further, the deformation of the metal layer 52 can prevent a large force from being applied to the insulating layer 53 at the time of pressing the bearing into the bearing box, so that the insulating layer 53 can be prevented from being separated from the outer ring. As the insulating layer 53 has its adhesiveness to the outer ring improved by the metal layer 51 and is protected, by the metal layer 52, against the pressure or force applied thereon at the time of the bearing is processed and pressed into the bearing box, the metal layer 53 can be prevented from being separated from the outer ring at that time.

At the time each layer mentioned above is formed, minute pores may be formed. Such pores may be sealed by impregnating a highly-osmotic adhesive while increasing the adhesiveness of the individual layers.

It should be understood that the insulation coating layer in the first embodiment can be employed in the bearing of the second embodiment, and vice versa without departing from the scope and spirit of the present invention. The bearing of the present invention may of course be modified in various manners within the scope and the spirit of the invention.

What is claimed is:

1. An anti-electrolytic corrosion type rolling bearing comprising:
   an outer ring with an outer surface; and
   a coating layer formed on said outer surface of said outer ring and having an insulating layer sandwiched between metal layers.

2. A rolling bearing according to claim 1, wherein one of said metal layers which serves as an inner coat has a thickness of 0.1 to 0.15 mm.

3. A rolling bearing according to claim 1, wherein one of said metal layers which serves as an outer coat has a thickness of 0.3 to 0.4 mm in consideration of a grinding allowance.

4. A rolling bearing according to claim 1, wherein said insulating layer has a thickness of 0.3 to 0.4 mm.

5. A rolling bearing according to claim 1, wherein metal layers are formed of a stainless steel based material, such as SUS410L, SUS430L, SUS304L or SUS316L, various iron-chrome based materials, such as a high carbon type, intermediate carbon type and low carbon type, or a nickel-aluminum based material containing a mixture of nickel and aluminum.

6. A rolling bearing according to claim 1, wherein said insulating layer is formed of a ceramic material, such as alumina, gray alumina, or zirconia.

7. An anti-electrolytic corrosion type rolling bearing comprising:
   an outer ring having an outer ring and two side walls; and
   a coating layer formed on said outer surface and said side walls of said outer ring and having an insulating layer sandwiched between metal layers.

8. A rolling bearing according to claim 7, wherein one of said metal layers which serves as an inner coat has a thickness of 0.1 to 0.15 mm.

9. A rolling bearing according to claim 7, wherein one of said metal layers which serves as an outer coat has a thickness of 0.3 to 0.4 mm in consideration of a grinding allowance.

10. A rolling bearing according to claim 7, wherein said insulating layer has a thickness of 0.3 to 0.4 mm.

11. A rolling bearing according to claim 7, wherein metal layers are formed of a stainless steel based material, such as SUS410L, SUS430L, SUS304L or SUS316L, various iron-chrome based materials, such as a high carbon type, intermediate carbon type and low carbon type, or a nickel-aluminum based material containing a mixture of nickel and aluminum.

12. A rolling bearing according to claim 7, wherein said insulating layer is formed of a ceramic material, such as alumina, gray alumina, or zirconia.

* * * * *